US011909455B2

(12) United States Patent
Tarver et al.

(10) Patent No.: US 11,909,455 B2
(45) Date of Patent: Feb. 20, 2024

(54) GLOBAL EQUALIZER SELF INTERFERENCE CANCELATION FOR HYBRID MIMO SYSTEMS

(71) Applicant: Samsung Electronics Co., Ltd., Suwon-si (KR)

(72) Inventors: Chance Tarver, Arlington, TX (US); Matthew Tonnemacher, Allen, TX (US); Khurram Muhammad, Southlake, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/818,692

(22) Filed: Aug. 9, 2022

(65) Prior Publication Data

US 2023/0050742 A1 Feb. 16, 2023

Related U.S. Application Data

(60) Provisional application No. 63/233,434, filed on Aug. 16, 2021.

(51) Int. Cl.

| | |
|---|---|
| ***H04B 17/10*** | (2015.01) |
| ***H04L 25/03*** | (2006.01) |
| ***H04B 7/0413*** | (2017.01) |
| ***H04B 17/15*** | (2015.01) |

(52) U.S. Cl.

CPC ......... *H04B 17/101* (2015.01); *H04B 7/0413* (2013.01); *H04B 17/15* (2015.01); *H04L 25/03006* (2013.01)

(58) Field of Classification Search

CPC ...... H04B 17/12; H04B 17/15; H04B 7/0413; H04L 25/03006

See application file for complete search history.

(56) References Cited

U.S. PATENT DOCUMENTS

| | | | | |
|---|---|---|---|---|
| 7,869,527 | B2 * | 1/2011 | Vetter | H04L 27/366 375/259 |
| 9,755,692 | B2 | 9/2017 | Choi et al. | |
| 10,714,836 | B1 * | 7/2020 | Karabacak | H04B 7/0868 |
| 11,121,737 | B2 | 9/2021 | Moorti et al. | |
| 2007/0116108 | A1 * | 5/2007 | Chen | H04L 25/03019 375/350 |
| 2016/0323916 | A1 * | 11/2016 | Lee | H04W 76/10 |

(Continued)

OTHER PUBLICATIONS

Ji, H., et al., "Extending 5G TDD Coverage with XDD: Cross Division Duplex", IEEE Access, vol. 9, Mar. 26, 2021, 13 pages.

*Primary Examiner* — Janice N Tieu

(57) ABSTRACT

A method includes transmitting, by a transceiver configured to concurrently transmit over multiple transmit paths and receive over multiple receive paths, one or more signals, the transceiver comprising multiple transmit antennas and multiple receive antennas. The method also includes, for at least one of the multiple receive antennas: receiving one or more feedback signals from one or more power amplifiers associated with the one or more transmitted signals; calculating one or more estimated self-interference (SI) signals based on the one or more feedback signals using an equalizer array comprising a predetermined channel model; and subtracting the one or more estimated SI signals from one or more receive signals received at the at least one receive antenna to obtain one or more residual signals.

20 Claims, 10 Drawing Sheets

1000
1008
1010
902
TX Signal 1
TX Path 1
TX Subarray 1
Feedback 1
1012
TX Signal N
TX Path N
TX Subarray N
Feedback N
EQ Estimation
1002
1014
RX Signal
Updated EQs
904
SIC Equalizer Array
932
RX Subarray 1
RX Subarray N
1015
SI Estimates
1016
Residual 1
SIC
1004
1014
RX Signal
Residual N

(56) References Cited

U.S. PATENT DOCUMENTS

| | | | |
|---|---|---|---|
| 2021/0314649 | A1 | 10/2021 | Veyseh et al. |
| 2022/0029774 | A1 | 1/2022 | Yuan et al. |
| 2022/0045713 | A1 | 2/2022 | Muhammad et al. |

* cited by examiner

In MIMO, multiple transmitted DL signals will interfere with a single received UL signal.

GLOBAL EQUALIZER SELF INTERFERENCE CANCELATION FOR HYBRID MIMO SYSTEMS

CROSS-REFERENCE TO RELATED APPLICATIONS AND CLAIM OF PRIORITY

The present application claims priority to U.S. Provisional Patent Application No. 63/233,434 filed on Aug. 16, 2021. The content of the above-identified patent document is incorporated herein by reference.

TECHNICAL FIELD

The present disclosure relates generally to wireless communication systems and, more specifically, the present disclosure relates to a global equalizer self-interference canceler for hybrid multi-antenna systems.

BACKGROUND

Modern cellular communication systems typically operate in either Time Division Duplexing (TDD) mode or in Frequency Division Duplexing (FDD) mode to accommodate bidirectional communication. In TDD mode, the uplink (UL) and downlink (DL) operate in distinct time slots, whereas in FDD mode they operate in distinct frequency bands.

There are several key tradeoffs between TDD and FDD systems, one of which can be seen in uplink coverage. TDD systems bound uplink duration in the time domain, while FDD systems do not. With UEs having limited power, this constrains the coverage, especially as the operating bandwidth is increased. TDD systems have the advantage of not requiring large bandwidth gaps between up and downlink channels. More complicated schemes, such as cross-division duplex (XDD), sub-band full duplex, and full-duplex (FD) systems, have provided a way in which these frequency bands can be utilized simultaneously, leveraging the benefits of both.

SUMMARY

The present disclosure relates to wireless communication systems and, more specifically, the present disclosure relates to a global equalizer self-interference canceler for hybrid multi-antenna systems.

In one embodiment, a method includes transmitting, by a transceiver configured to concurrently transmit over multiple transmit paths and receive over multiple receive paths, one or more signals, the transceiver comprising multiple transmit antennas and multiple receive antennas. The method also includes, for at least one of the multiple receive antennas: receiving one or more feedback signals from one or more power amplifiers associated with the one or more transmitted signals; calculating one or more estimated self-interference (SI) signals based on the one or more feedback signals using an equalizer array comprising a predetermined channel model; and subtracting the one or more estimated SI signals from one or more receive signals received at the at least one receive antenna to obtain one or more residual signals.

In another embodiment, a device includes a transceiver configured to concurrently transmit one or more signals over multiple transmit paths and receive one or more receive signals over multiple receive paths, the transceiver comprising multiple transmit antennas and multiple receive antennas. The device also includes a processor operably connected to the transceiver. The processor is configured to, for at least one of the multiple receive antennas: receive one or more feedback signals from one or more power amplifiers associated with the one or more transmitted signals; calculate one or more estimated SI signals based on the one or more feedback signals using an equalizer array comprising a predetermined channel model; and subtract the one or more estimated SI signals from the one or more receive signals to obtain one or more residual signals.

In yet another embodiment, a non-transitory computer readable medium includes program code that, when executed by a processor of a device, causes the device to: control a transceiver to transmit one or more signals, the transceiver configured to concurrently transmit over multiple transmit paths and receive over multiple receive paths, the transceiver comprising multiple transmit antennas and multiple receive antennas; and for at least one of the multiple receive antennas: receive one or more feedback signals from one or more power amplifiers associated with the one or more transmitted signals; calculate one or more estimated SI signals based on the one or more feedback signals using an equalizer array comprising a predetermined channel model; and subtract the one or more estimated SI signals from one or more receive signals received at the at least one receive antenna to obtain one or more residual signals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
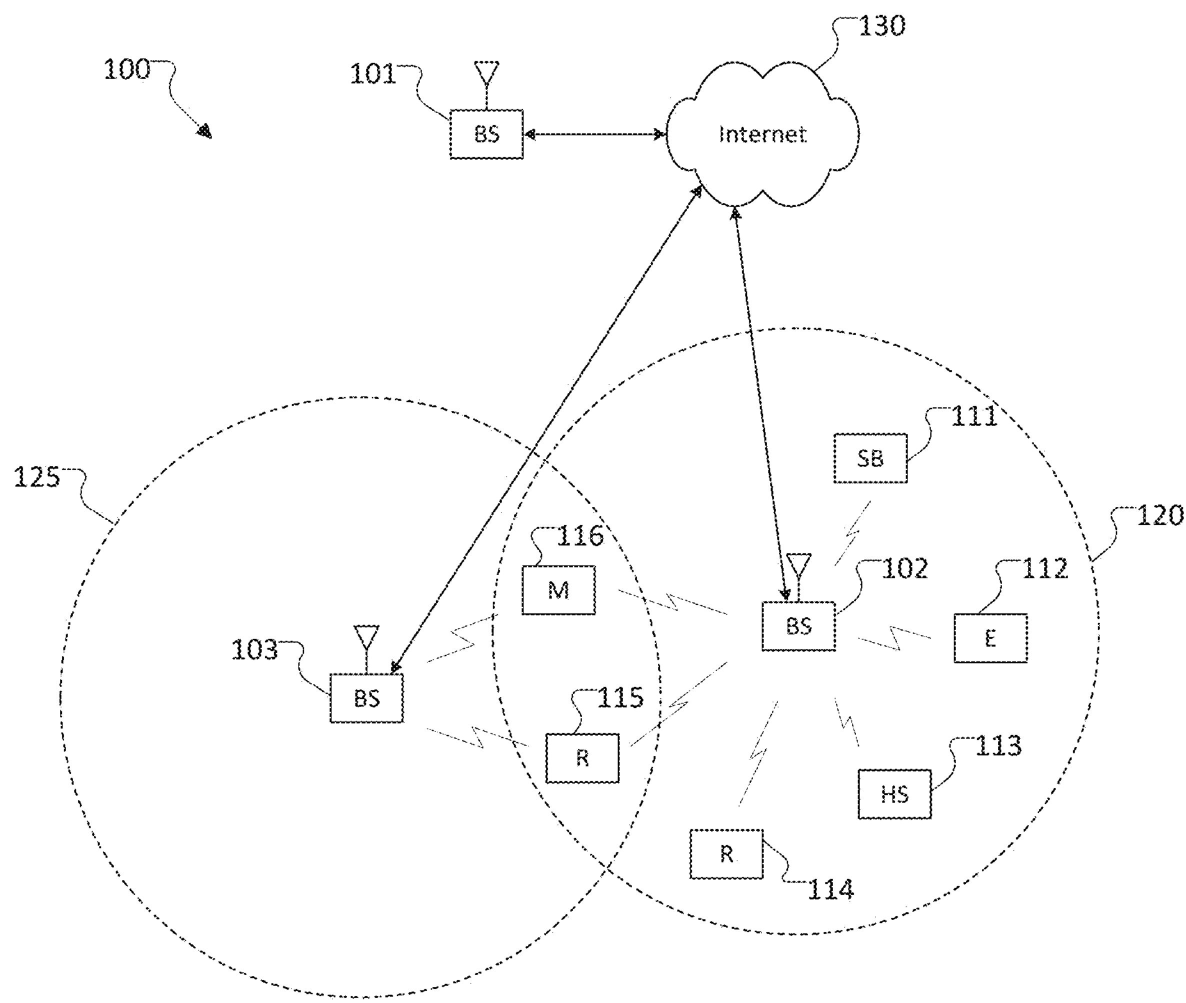
FIG. 1 illustrates an example wireless network according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for global equalizer self-interference cancelation for hybrid multi-antenna systems. In certain embodiments, and one or more of the gNBs 101-103 includes circuitry, programming, or a combination thereof for global equalizer self-interference cancelation for hybrid multi-antenna systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
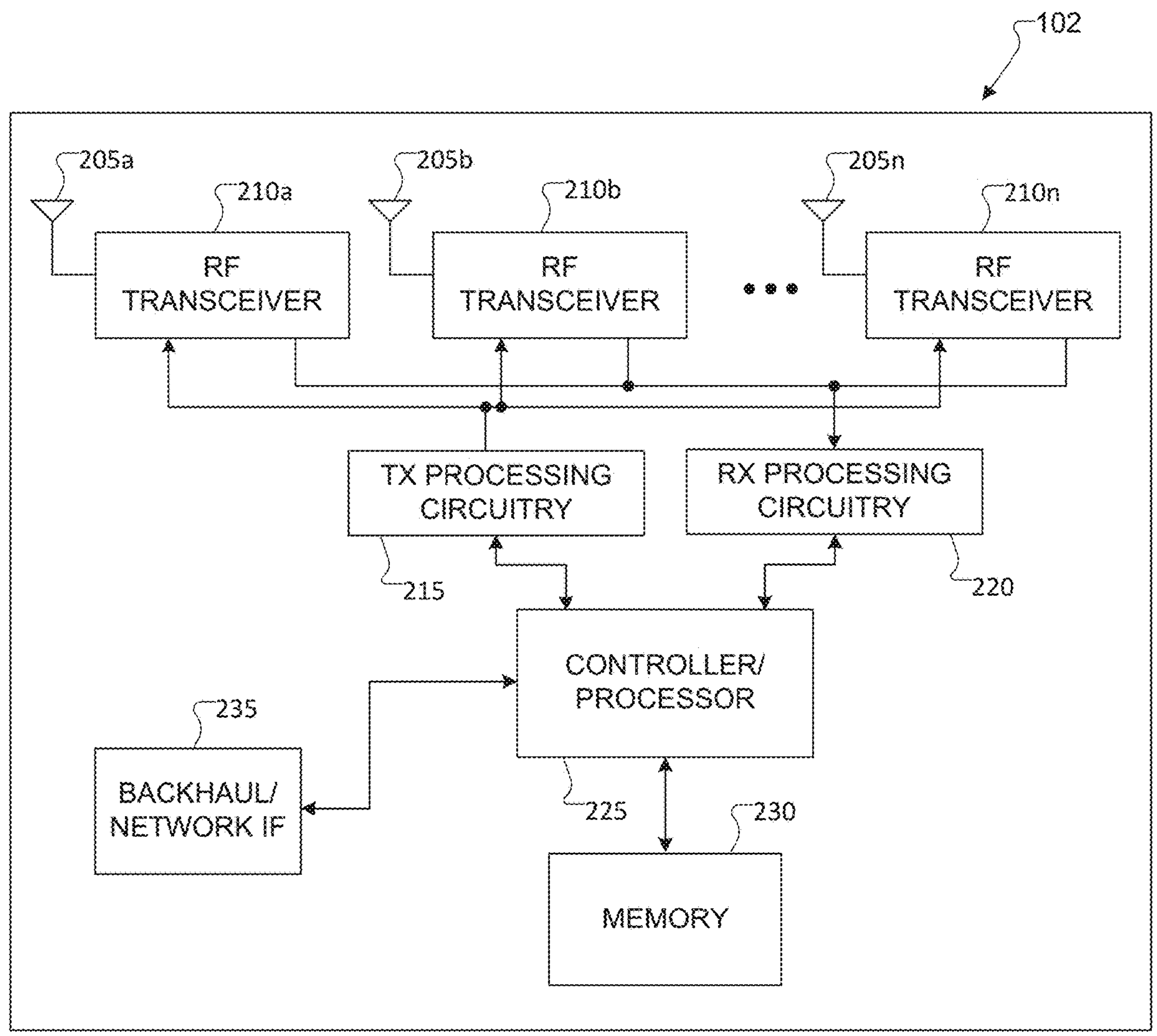
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple RF transceivers 210*a*-210*n*, transmit (TX) processing circuitry 215, and receive (RX) processing circuitry 220. The gNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support methods for global equalizer self-interference cancelation for hybrid multi-antenna systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
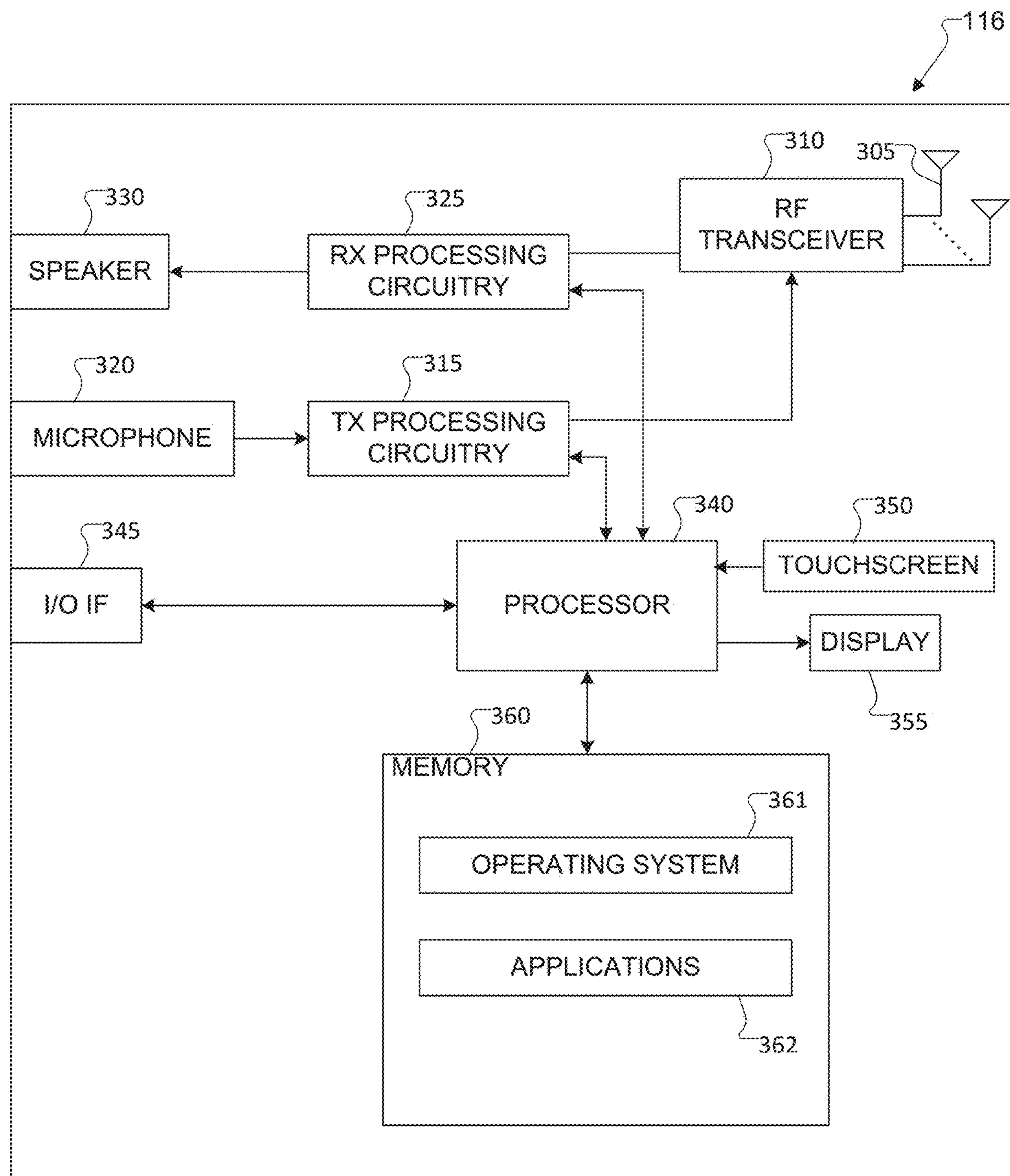
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for global equalizer self-interference cancelation for hybrid multi-antenna systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
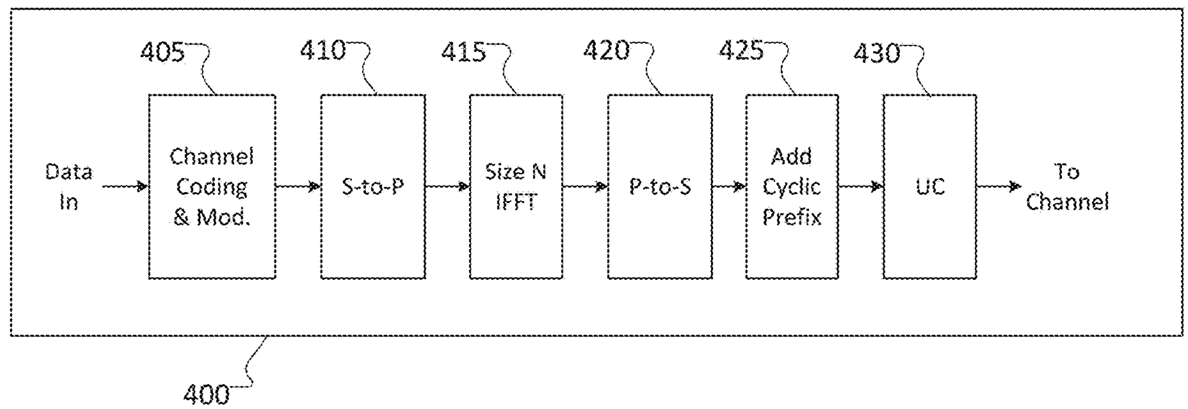
FIG. 4A illustrates a high-level diagram of an orthogonal frequency division multiple access transmit path according to embodiments of the present disclosure.
Figure 4B:
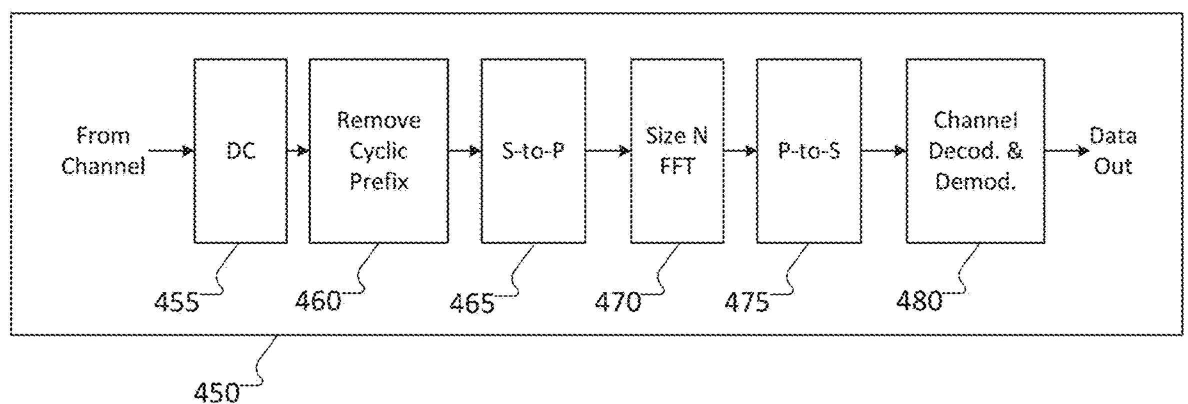
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the gNB 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNB s 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
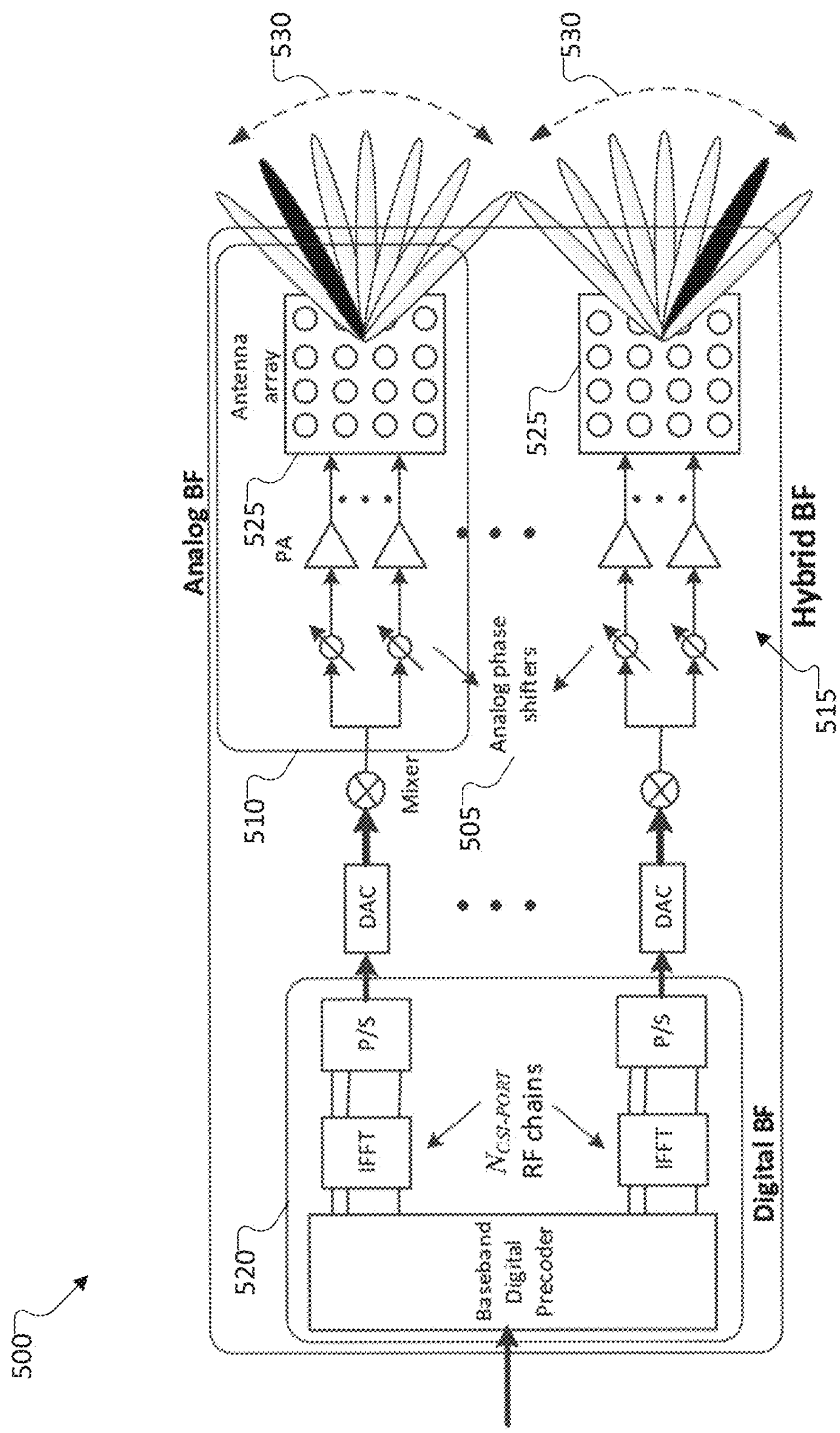
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (~10 decibels (dB) additional loss @ 100 m distance), larger number of and sharper analog beams (hence larger number of radiators in the array) will be needed to compensate for the additional path loss.

Figure 6:
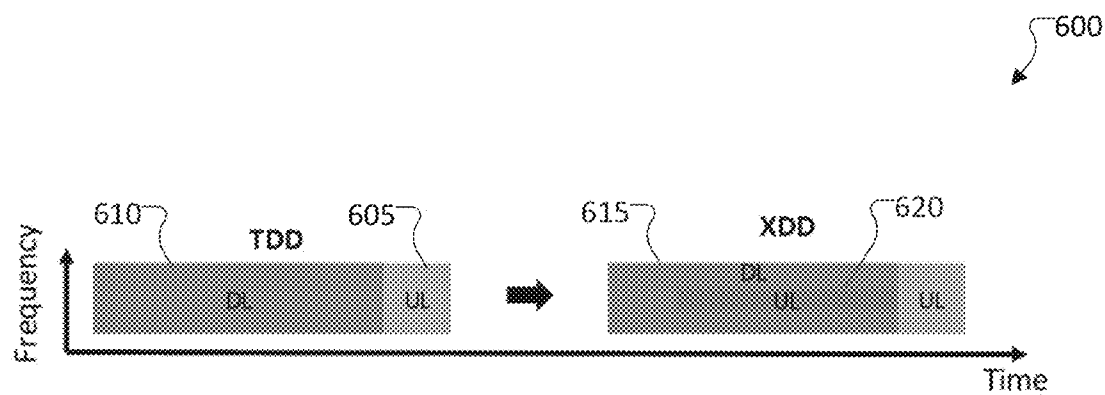
FIG. 6 illustrates examples of a TDD communication and a XDD communication according to embodiments of the present disclosure.

FIG. 6 illustrates examples of a TDD communication and a cross-division duplex (XDD) communication according to embodiments of the present disclosure. The embodiments of the TDD and XDD communications 600 shown in FIG. 6 are for illustration only. Other embodiments can be used without departing from the scope of the present disclosure.

Modern cellular communication systems typically operate in either TDD mode or in FDD mode to accommodate bidirectional communication. In TDD mode, the UL 605 and DL 610 operate in distinct time slots, whereas in FDD mode they operate in distinct frequency bands.

There are several key tradeoffs between TDD and FDD systems, one of which can be seen in uplink coverage. TDD systems bound uplink duration in the time domain, while FDD systems do not. With UEs having limited power, this constrains the coverage, especially as the operating bandwidth is increased. TDD systems have the advantage of not requiring large bandwidth gaps between up and downlink channels. More complicated schemes, such as XDD and Full-Duplex (FD) systems, have provided a way in which these frequency bands can be utilized simultaneously, leveraging the benefits of both.

In FD systems, the uplink and downlink operate in the same time/frequency resources. This duplexing ultimately leads to extreme self-interference (SI) problems, as almost all of a base station's transmitter power will appear on its uplink receiver. Moreover, there may also be significant interference from adjacent channel leakage due to power amplifiers (PAs) in nearby high-power base stations operating in adjacent channels.

XDD is a new paradigm that provides a unique compromise between FDD and TDD, leveraging the benefits of both. An XDD system is one in which simultaneous downlink 615 and uplink 620 are achieved in the same contiguous band, gaining FDD benefits in an unpaired TDD band. A portion of DL is assigned to UL while the DL is operating and transmitting adjacent channel power (ACP) in the UL band. Relying on a minimal guard band between uplink and downlink usually is not possible due to the substantial adjacent channel leakage from the downlink transmitter interfering with the intended received signal.

A self-interference cancelation (SIC) technique can be used to alleviate the SI. This cancelation can be performed digitally where the system aligns and removes an estimate of the transmitted signal in the DL band from the incoming received signal in the UL band. While the system knows the original baseband waveform it transmitted, the effects of multiple analog components and a channel must be accounted for when estimating the SI. In particular, the PAs introduce extreme nonlinear distortion. Accurately modeling and applying self-interference cancelation is practically challenging, especially in MIMO systems where there may be many transmitters and receivers at the base station.

A generalized memory polynomial (GMP) is typically used to model a PA or its inverse for SIC and digital predistortion (DPD), respectively. GMPs include multiple nonlinearities and memory effects to model a device accurately. However, these models can quickly grow to include hundreds of parameters. Hence, fitting a GMP to a particular system, especially a MIMO system, has high computational complexity.

While GMPs are popular for DPD applications, they are often not sufficient for SIC applications. In DPD, the goal is to linearize a PA to meet a spectral mask requirement. Hence, the GMP model needs to be just large enough to accomplish this task. In XDD and FD systems, the goal is to cancel SI to the receiver noise floor, requiring higher accuracy in the model and much more complexity. Moreover, to maintain SIC performance near the noise floor, GMP-based systems need frequent updating of the models as any device operation changes, for example, due to temperature changes, will degrade SIC performance. This problem is exacerbated in MIMO systems where each transmitter's nonlinearities may be present on each receiver, requiring multiple high-complexity GMP models to need to be maintained and computed.

Figure 7:
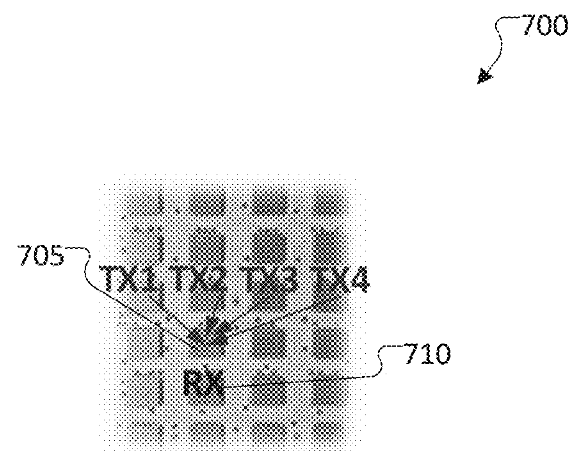
FIG. 7 illustrates an example of a multiple antenna array according to embodiments of the present disclosure.

FIG. 7 illustrates an example of a multiple antenna array 700 according to embodiments of the present disclosure. The embodiment of the multiple antenna array 700 shown in FIG. 7 is for illustration only. Other embodiments can be used without departing from the scope of the present disclosure.

In certain embodiments, an XDD system antenna includes a plurality of antenna ports comprising N transmit antennas 705 and M receive antennas 710, where M and N are integers. As shown in the example depicted in FIG. 7, in a MIMO system, multiple transmitted DL signals can interfere with a single received UL signal.

Figure 8:
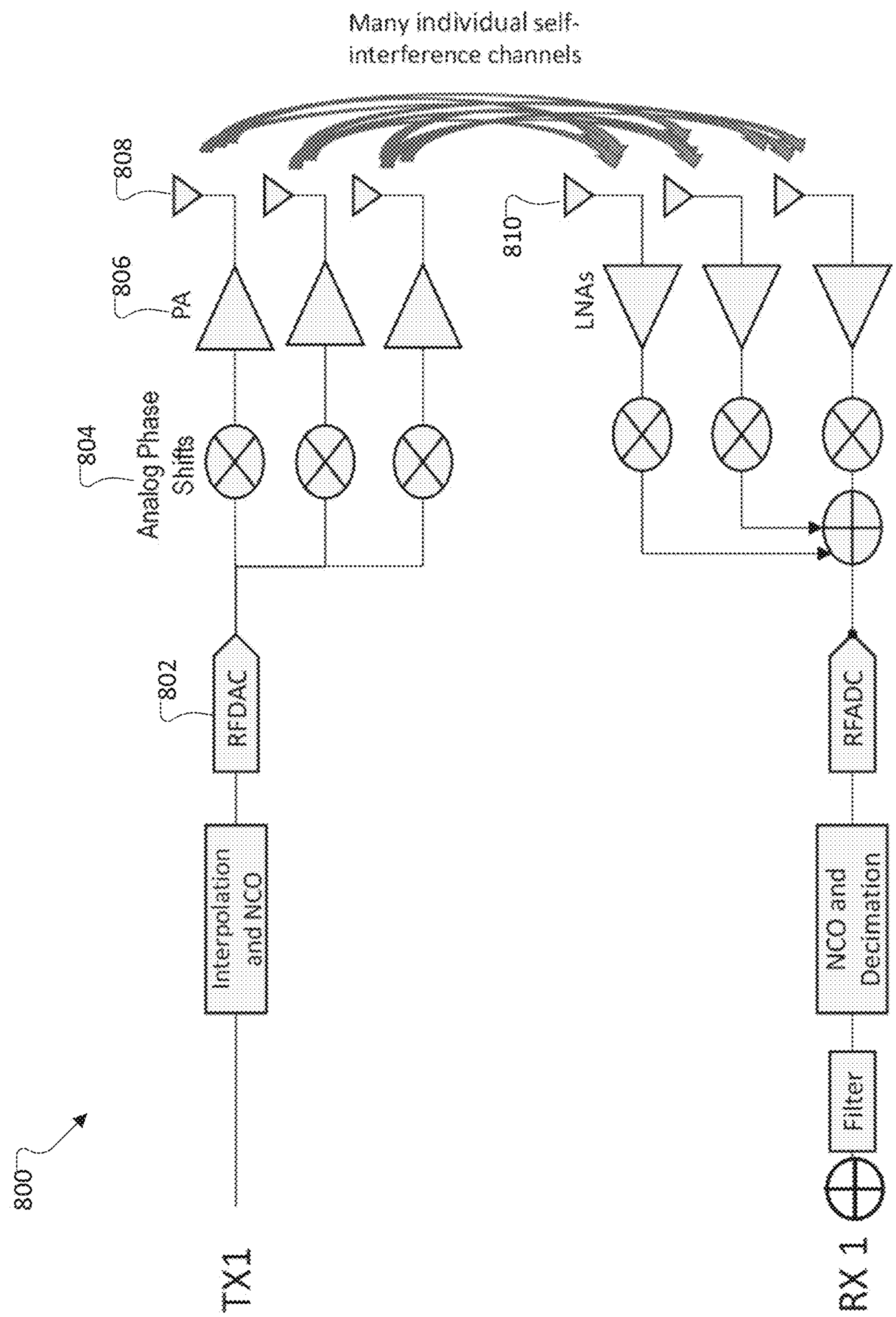
FIG. 8 illustrates an example hybrid MIMO system according to embodiments of the present disclosure.

The problem of self-interference cancelation becomes further complicated in hybrid MIMO systems, such as the example shown in FIG. 8. FIG. 8 illustrates an example hybrid MIMO system 800, where each digital to analog converter 802 is followed by an analog beamformer that splits the input to multiple analog RF chains with dedicated phase shifters 804 and PAs 806. Such a system increases the number of antennas and hence the spatial diversity and beamforming gain without a substantial increase in digital complexity. The hybrid beamforming could be used in any frequency band such as one of the sub-6 GHz frequency bands or mmWave or higher frequency bands. Generally, mmWave and higher frequency bands have more prevalent use of hybrid beam forming.

While the compromise between analog and digital beamforming in hybrid MIMO system is valuable, it makes performing SIC challenging. For example, when the hybrid MIMO system 800 operates in XDD or FD modes, the transmit signal from each transmit antenna 808 will interfere with each received signal at each receive antenna 810. Conventional SIC solutions used in single-input single-output (SISO) systems are not applicable because SISO-like cancelation does not consider all the paths from each antenna in the TX subarray to each RX in the RX subarray.

To address these and other issues, this disclosure provides a system and method for global equalizer self-interference cancelation for hybrid multi-antenna (e.g., MIMO) systems. As described in more detail below, the disclosed embodiments utilize the normally present PA feedback and a set of SIC equalizers to replicate the channels between the TX paths and RX paths in a hybrid MIMO context where the exact RX signal at each antenna is unknown. To perform SIC, the disclosed embodiments learn the channel between the TX path and each RX path, such that a combination of TX signals transformed by the TX path model and subsequently passed through the learned channel model can be used to estimate the SI at each receiver which is due to the TX signal leaking into the RX path through the TX and RX antennas. The disclosed embodiments learn the channel between each analog TX path and each analog RX path when only the lower dimensional data before the analog phase shifter and after the ADCs are available.

The disclosed embodiments are capable of estimation and cancelation of self-interference in a hybrid MIMO system, with application to massive MIMO systems. The disclosed embodiments can be used in any MIMO system requiring self-interference estimation and cancelation such as full-duplex systems and mXDD systems. By having high-performance digital self-interference cancelation, such as provided by the disclosed embodiments, operators can save hardware costs due to not needing (or at least reducing the need for) analog SIC circuitry, transmitter and receiver isolation via filtering, and transmitter and receiver isolation from antenna structure design.

Note that while some of the embodiments discussed below are described in the context of hybrid MIMO systems, these are merely examples. It will be understood that the principles of this disclosure may be implemented in any number of other suitable contexts or systems.

Figure 9:
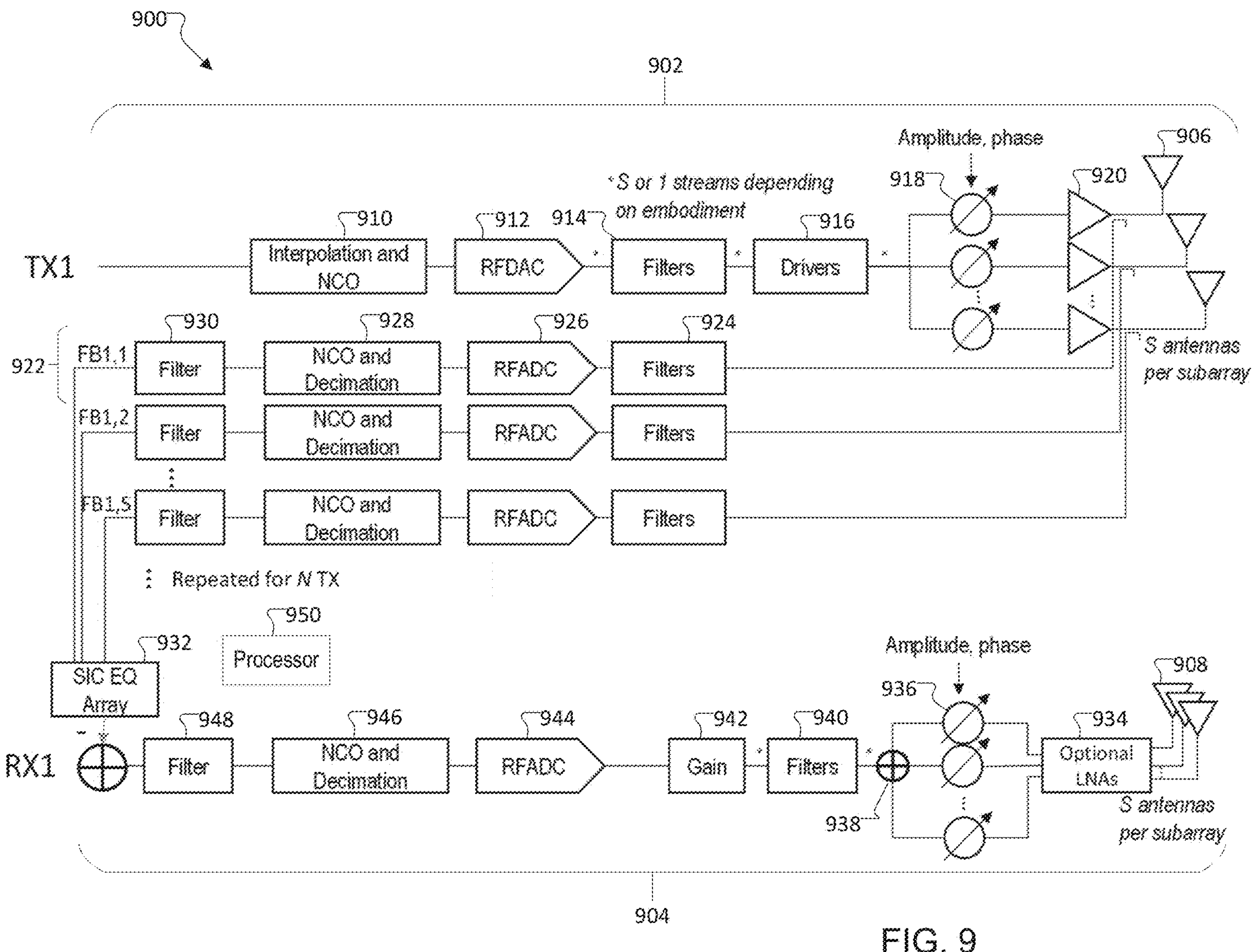
FIG. 9 illustrates an example system in which global equalizer SIC can be performed according to embodiments of the present disclosure.

FIG. 9 illustrates an example system 900 in which global equalizer SIC can be performed according to embodiments of the present disclosure. The embodiment of the system 900 shown in FIG. 9 is for illustration only. Other embodiments of the system 900 could be used without departing from the scope of this disclosure.

As described in greater detail below, the system 900 is able to perform SIC by learning the channel between each TX path and each RX path, such that a combination of TX signals transformed by the TX path model and subsequently passed through the learned channel model can be used to estimate the SI at each receiver which is due to the TX signal leaking into the RX path through the TX and RX antennas. The system 900 learns the channel between each analog TX path and each analog RX path when only the lower dimensional data before the analog phase shifter and after the ADCs are available. The estimated SI signal can then be subtracted from the received signal, leaving only the intended uplink signal.

As shown in FIG. 9, the system 900 is a hybrid MIMO array system that includes N TX subarrays 902 and M RX subarrays 904. While only one TX subarray 902 (TX1) and one RX subarray 904 (RX1) are shown in FIG. 9, it will be understood that the system 900 can include additional TX and RX subarrays. Depending on the embodiment, the values of M and N may be the same or different. Each TX subarray 902 includes S TX antennas 906 and each RX subarray 904 includes S RX antennas 908. Thus, in the system 900, there is a total of N*S TX antennas 906 separated from M*S RX antennas 908. The antennas 906, 908 may be partitioned on the same antenna panel or may be located on multiple antenna panels.

Each TX subarray 902 includes an interpolation and NCO (numerically controlled oscillation) block 910 followed by a RF digital-to-analog converter (RFDAC) 912, which converts the digital signal to analog. The RFDAC 912 is connected to matching and isolation circuitry, which can include one or more anti-aliasing filters 914 and drivers 916. The analog signal is split into S transmit paths, and in each transmit path, the analog signal passes through a beamformer, which includes a phase shifter 918 and a PA 920. The analog signal is then passed to the antenna 906, which transmits to the RX antennas 908.

Each TX subarray 902 also includes S feedback paths 922. For example, for the subarray TX1, the S feedback paths 922 are referred to as FB1,1 through FB1,S. Each feedback path 922 is coupled to a corresponding one of the PAs 920, and is provided to capture feedback from the PA 920. The feedback path 922 converts the analog feedback to the digital domain, in order to perform DPD learning. Each feedback path 922 includes one or more analog filters 924, a RF analog-to-digital converter (RFADC) 926 (which converts the analog signal from the PA 920 back to digital), a NCO and decimation block 928, and one or more digital filters 930. The feedback path 922 provides a digitized replica of the signal at the output of the PA 920, which can be used to create an estimate of the TX signal on each antenna 906 of the TX subarray 902. The digital signals from each feedback path 922 can be provided to a processor 950 (e.g., the processor 225), which can use the signals to determine a SIC equalizer array 932, as described in greater detail below. The SIC equalizer array 932 comprises a modelled set of SIC equalizers, where each SIC equalizer is for a corresponding pair of TX and RX paths. The SIC equalizer array 932 replicates the channels between the TX paths and RX paths in a hybrid MIMO context, where the exact RX signal at each RX antenna 908 is unknown. Once the SIC equalizer array 932 is determined, the system 900 can use the SIC equalizer array 932 to perform SIC.

The RX subarray 904 includes the S RX antennas 908, one or more optional low noise amplifiers (LNAs) 934, phase shifters 936, a combiner 938 provided to combine the S analog signals into a combined signal, one or more filters 940 and gain blocks 942, a RFADC 944 provided to convert the analog signal back to digital, one or more NCO and decimation blocks 946, and one or more filters 948.

In one aspect of operation, to estimate self-interference (SI), the system 900 transmits a known signal on all transmitters simultaneously with known analog beamforming settings (i.e., the settings of the phase shifters 918, 936 in the TX and RX are predetermined and known). The processor 950 then determines the SIC equalizer array 932 based on the individual self-interference channels from each TX antenna 906 to each RX antenna 908. In some embodiments, the processor 950 solves a global least-squares problem to learn the SIC equalizers of the SIC equalizer array 932. As described in greater detail below, the global least-squares problem takes into account the digital transmit signals passed through the individual PAs 920 and the signals received from the corresponding RX subarrays 904. The SIC equalizers are modelled after the individual interference channels from each TX antenna 906 to each RX antenna 908. Each learned channel between an TX antenna 906 and a RX antenna 908 may include a variety of standard channel effects such as multi-tap effects due to multiple reflections.

Once the processor 950 learns the SIC equalizers of the SIC equalizer array 932, the processor 950 can then pass the feedback signals from each feedback path 922 through the SIC equalizer array 932 in the digital domain to estimate the self-interference on each received signal. The processor 950 then applies SIC by subtracting the self-interference estimate from each receiver. The resulting uplink signal on each receiver will have improved SINR and, consequently, improved channel capacity.

Figure 10:
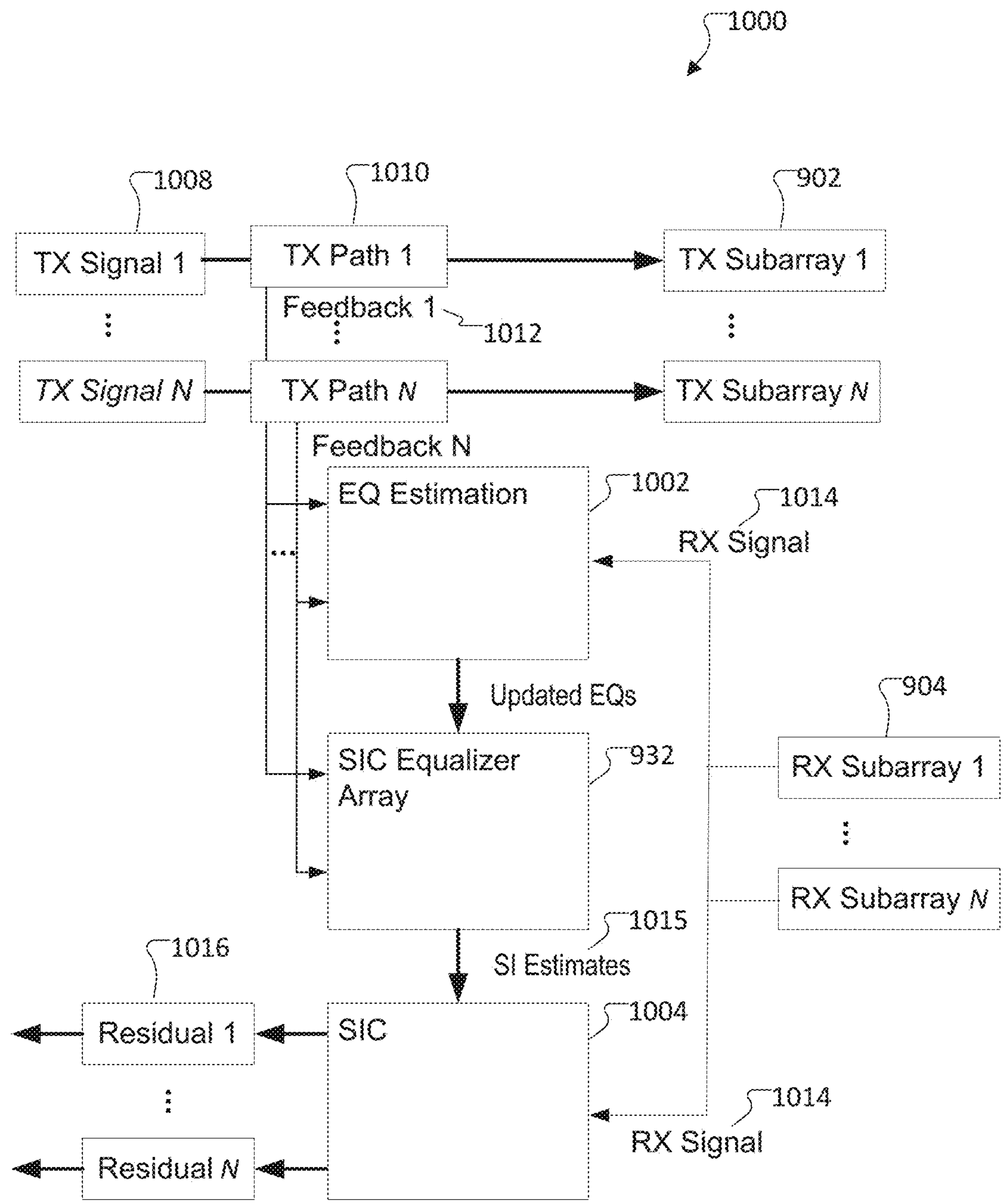
FIG. 10 illustrates an example framework for performing global equalizer SIC according to embodiments of the present disclosure.

FIG. 10 illustrates an example framework 1000 for performing global equalizer SIC according to embodiments of the present disclosure. For ease of explanation, the framework 1000 will be described as being performed using the system 900 of FIG. 9. The embodiment of the framework 1000 shown in FIG. 10 is for illustration only. Other embodiments of the framework 1000 could be used without departing from the scope of this disclosure.

As shown in FIG. 10, the framework 1000 includes an equalizer (EQ) estimation block 1002 and a SIC block 1004. Each of the blocks 1002-1004 can be implemented by hardware, circuitry, or a combination of software and hardware configured to perform the respective functions. For example, in some embodiments, all or portions of the blocks 1002-1004 can be implemented by the processor 950.

Before SIC can be performed, the SIC equalizers comprising the SIC equalizer array 932 need to be learned. The EQ estimation block 1002 includes operations and algorithms for determining the SIC equalizers. To learn the coefficients for each SIC equalizer, the system 900 first broadcasts TX signals 1008 on all TX paths 1010, which include all TX subarrays 902. The system 900 collects TX feedback signals 1012 in each feedback path 922 to capture all the nonlinearities created by the PA 920 or other components in each TX path. All TX feedback signals 1012 and RX signals 1014 from each RX subarray 904 are provided to the EQ estimation block 1002, where the system 900 performs a least-squares estimation to jointly learn SIC equalizers from each TX path (using the digitally transformed signals) to each RX path. Each equalizer here is a learned interference channel between each transformed TX signal 1008 to each RX signal 1014.

In the EQ estimation block 1002, the system 900 receives both the TX feedback signals 1012 and the RX signals 1014, estimates the channel transformation (equalizer) between each TX feedback signal 1012 and RX signal 1014, and outputs the array of learned SIC equalizers comprising the SIC equalizer array 932. Stated differently, once the feedback $\hat{x}_i$ [n] has been captured for each transmit path (where i indexes the PA 920 and n indexes the samples), the system 900 determines FIR filters of length K, $h_{i;j}[k]$, that minimize the squared error between all TX antenna output signals and the jth RX signal. Here, the least-squares is solved over all filters simultaneously, hence the use of the term "global equalizer."

The processor 950 can update the SIC equalizer array 932 once the equalizers are determined. The processor 950 can then use the updated SIC equalizer array 932 with input feedback signals 1012 to determine estimated SI signals 1015 for each RX signal 1014. The estimated SI signals 1015 are passed to the SIC block 1004.

In the SIC block 1004, the processor 950 subtracts each estimated SI signal 1015 from each RX signal 1014 and outputs a set of residuals 1016, which represent the interference-free RX signals. Each residual 1016 is the received uplink signal vector once the estimated SI has been removed. With the SI removed, the residual has an improved SINR. In some embodiments, the system 900 can apply each FIR filter to compute the jth residual 1016 $u_j$ [n] on each RX signal 1014 as given by the following equation:

$$u_j[n]=y_j[n]-\Sigma_{i=1}^{N}\Sigma_{s=1}^{S}\Sigma_{r=1}^{S}\beta_{j,r}(h_{i,s;j,r}[k]*x_{i,s}[n]). \quad (1)$$

where $y_j$ [n] represents the signal output from the filter 948, $x_{i,s}$ is the feedback for the analog TX beamformer for DAC stream i (i.e., the index i indicates which TX subarray 902), antenna port s (i.e., the index s indicates which TX antenna 906 of the TX subarray 902), $h_{i,s;j,r}[k]$ represents the filters, and $\beta_{j,r}$ represent the analog RX beamformer for ADC j port r (i.e., the indices j and r indicate which RX subarray 904 and which RX antenna 908).

Later, the SIC equalizer array 932 can be updated by calculating the SIC equalizer array 932 again, if it is expected to have changed for some reason. In some embodiments, the SIC equalizer modelling could be completed for all transmit paths simultaneously or in batches larger than one at a time.

Although FIGS. 9 and 10 illustrates examples of a system 900 and a framework 1000 for global equalizer SIC and related details, various changes may be made to FIGS. 9 and 10. For example, one or more components of the system 900 could be replaced with a conventional TX or RX path that can include one or more baseband filters, up- or down-conversion mixers, drivers, LNAs, local oscillation paths, phase lock loops (PLLs), or the like. Also, computation of the estimators could be performed using approaches other than least-squares, such as least mean square (LMS). Furthermore, various components in FIGS. 9 and 10 could be combined, further subdivided, or omitted and additional components could be added according to particular needs. In addition, various operations in FIGS. 9 and 10 could overlap, occur in parallel, occur in a different order, or occur any number of times.

Figure 11:
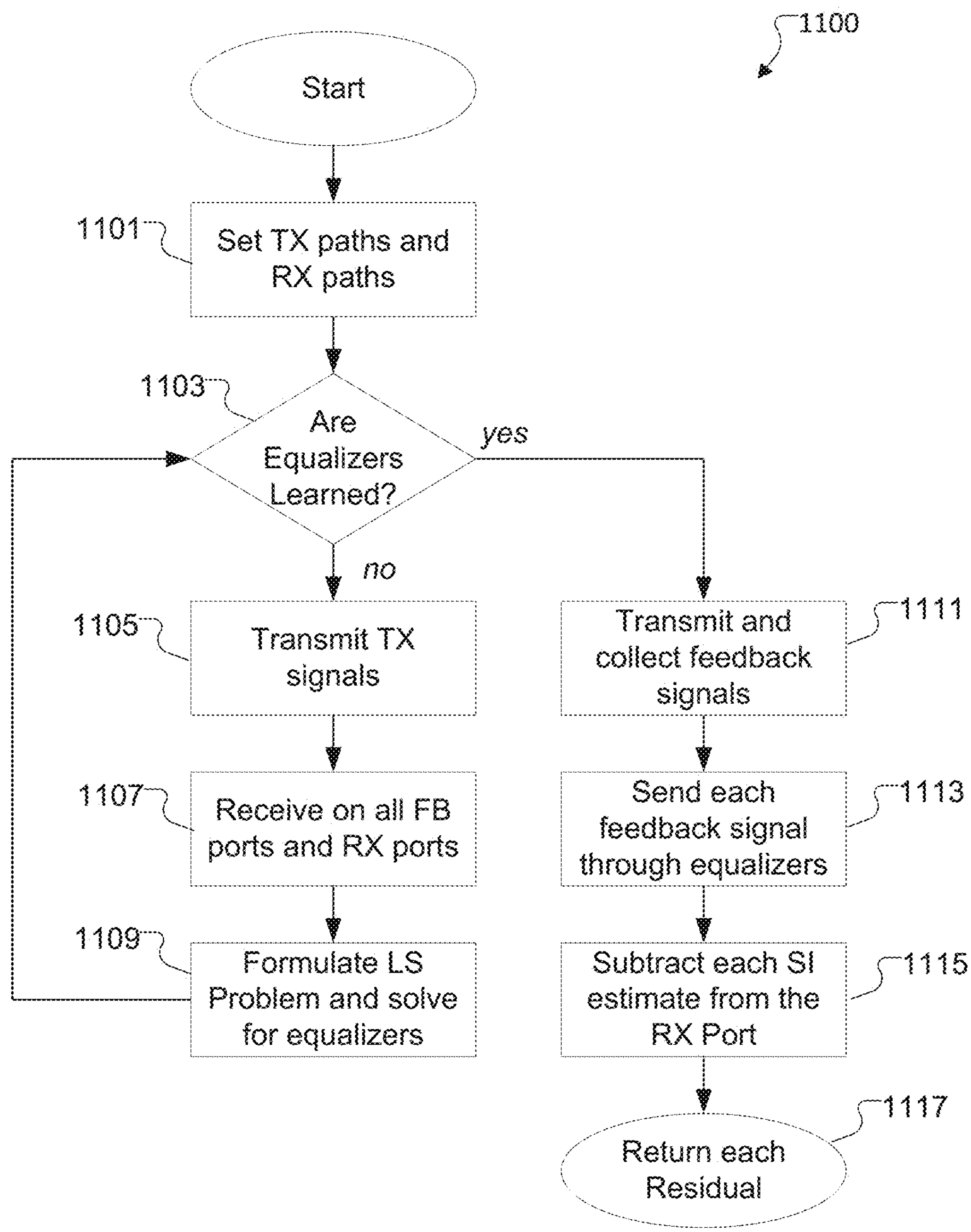
FIG. 11 illustrates a flow chart of a method for global equalizer SIC according to embodiments of the present disclosure.

FIG. 11 illustrates a flow chart of a method 1100 for global equalizer SIC according to embodiments of the present disclosure, as may be performed by one or more components of the system 900 (e.g., the processor 950 as illustrated in FIG. 9). The embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1101. At step 1101, the system 900 is configured for hybrid MIMO communication by initializing the TX and RX paths. This could include, for example, configuring the system 900 with multiple TX subarrays 902 (each having S TX antennas 906) and multiple RX subarrays 904 (each having S RX antennas 908).

At step 1103, the system determines if SIC equalizers have been learned for use with SIC. Before SIC can be performed, the SIC equalizers need to be learned. This could include, for example, the processor 950 determining if the SIC equalizer array 932 includes a set of valid SIC equalizers. If it is determined that the SIC equalizers have not been learned, then the method 1100 continues to step 1105. Alternatively, if it is determined that the SIC equalizers have been learned, then the method 1100 moves to step 1111.

At step 1105, the system broadcasts TX signals on all transmitters in the array. This could include, for example, the system 900 transmitting TX signals 1008 on all TX antennas 906. As shown in the example depicted in FIG. 9, the feedback paths 922 are coupled to the output of each transmit path, capturing all the nonlinearities created by each PA 920.

At step 1107, the system receives the feedback signals associated with the transmitted TX signals and the RX signals received by the RX antennas. This could include, for example, the system 900 receiving the feedback signals 1012 and the RX signals 1014. The feedback signals 1012 and the RX signals 1014 can be provided to the EQ estimation block 1002.

At step 1109, the system solves for the SIC equalizers. This could include, for example, the processor 950 using the EQ estimation block 1002 to perform a least squares (LS) estimation to jointly learn equalizer functions from each feedback path 922 to each RX path. Each equalizer function here is a learned interference channel between each amplified TX signal 1008 to each RX signal 1014. The SIC equalizer array 932 is then updated with the learned SIC equalizers, and the method returns to step 1103.

During an application phase, at step 1111, the system transmits TX signals and collects feedback signals. This could include, for example, the system 900 transmitting TX signals 1008 on one or more TX antennas 906 and collecting one or more feedback signals 1012 associated with the TX signals 1008.

At step 1113, the system passes the feedback signals through each of the equalizers and linearly combines the feedback signals to create a total estimated SI signal for each RX port. This could include, for example, the processor 950 passing the feedback signals 1012 through the SIC equalizer array 932 to generate the estimated SI signals 1015 for the RX ports.

At step 1115, the system subtracts the estimated SI signal from each RX signal. This could include, for example, the processor 950 using the SIC block 1004 to subtract the estimated SI signals 1015 from the RX signals 1014, thereby generating the set of residuals 1016.

At step 1117, the system returns the set of residuals in which the SI has been removed. This could include, for example, the processor 950 returning the set of residuals 1016. Each residual 1016 contains only the uplink signal with an improved SINR.

Although FIG. 11 illustrates one example of a method 1100 for global equalizer SIC, various changes may be made to FIG. 11. For example, while shown as a series of steps, various steps in FIG. 11 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

transmitting, by a transceiver configured to concurrently transmit over multiple transmit paths and receive over multiple receive paths, one or more signals, the transceiver comprising multiple transmit antennas and multiple receive antennas;

determining an equalizer array comprising a predetermined channel model;

for at least one of the multiple receive antennas:

receiving one or more feedback signals from one or more power amplifiers associated with the one or more transmitted signals;

calculating one or more estimated self-interference (SI) signals based on the one or more feedback signals using the equalizer array; and subtracting the one or more estimated SI signals from one or more receive signals received at the at least one receive antenna to obtain one or more residual signals, wherein the equalizer array is determined by broadcasting second transmit signals on all of the multiple transmit antennas, and receiving (i) second feedback signals associated with the second transmit signals and (ii) second receive signals received by the multiple receive antennas.

2. The method of claim 1, wherein the one or more SI signals are configured to cancel SI caused by the one or more transmitted signals leaking into at least one of the multiple receive paths of the transceiver.

3. The method of claim 1, wherein the equalizer array is further determined by performing an estimation using the second feedback signals and the second receive signals to learn multiple equalizers comprising the equalizer array.

4. The method of claim 1, wherein:

the transceiver is part of a hybrid multiple-input multiple-output (MIMO) system; and the multiple transmit paths are grouped into subarrays, each subarray associated with one radio frequency digital-to-analog converter (RFDAC), multiple analog phase shifters, and multiple power amplifiers.

5. The method of claim 4, wherein a channel between each transmit path and each receive path is determined based on information associated with one or more analog phase shifter values.

6. The method of claim 1, wherein an exact receive signal at each of the multiple receive antennas is unknown.

7. The method of claim 1, wherein the one or more feedback signals are received via one or more feedback paths, each feedback path comprising one or more of:

at least one filter;

a radio frequency analog-to-digital converter (RFADC); and a numerically controlled oscillator (NCO).

8. A device comprising:

a transceiver configured to concurrently transmit one or more signals over multiple transmit paths and receive one or more receive signals over multiple receive paths, the transceiver comprising multiple transmit antennas and multiple receive antennas;

a processor operably connected to the transceiver, the processor configured to:

determine an equalizer array comprising a predetermined channel model; and for at least one of the multiple receive antennas:

receive one or more feedback signals from one or more power amplifiers associated with the one or more transmitted signals;

calculate one or more estimated self-interference (SI) signals based on the one or more feedback signals using the equalizer array; and subtract the one or more estimated SI signals from the one or more receive signals to obtain one or more residual signals, wherein to determine the equalizer array, the processor is configured to broadcast second transmit signals on all of the multiple transmit antennas, and receive (i) second feedback signals associated with the second transmit signals and (ii) second receive signals received by the multiple receive antennas.

9. The device of claim 8, wherein the one or more SI signals are configured to cancel SI caused by the one or more transmitted signals leaking into at least one of the multiple receive paths of the transceiver.

10. The device of claim 8, wherein to determine the equalizer array, the processor is further configured to perform an estimation using the second feedback signals and the second receive signals to learn multiple equalizers comprising the equalizer array.

11. The device of claim 8, wherein:

the device is part of a hybrid multiple-input multiple-output (MIMO) system;

the transceiver further comprises multiple subarrays, each subarray comprising a radio frequency digital-to-analog converter (RFDAC), multiple analog phase shifters, and multiple power amplifiers; and the multiple transmit paths are grouped into the subarrays.

12. The device of claim 11, wherein a channel between each transmit path and each receive path is determined based on information associated with one or more analog phase shifter values.

13. The device of claim 8, wherein an exact receive signal at each of the multiple receive antennas is unknown.

14. The device of claim 8, wherein:

the transceiver further comprises multiple feedback paths, each feedback path comprising one or more of: at least one filter, a radio frequency analog-to-digital converter (RFADC), and a numerically controlled oscillator (NCO); and the one or more feedback signals are received via one or more of the feedback paths.

15. A non-transitory computer readable medium comprising program code that, when executed by a processor of a device, causes the device to:

control a transceiver to transmit one or more signals, the transceiver configured to concurrently transmit over multiple transmit paths and receive over multiple receive paths, the transceiver comprising multiple transmit antennas and multiple receive antennas;

determine an equalizer array comprising a predetermined channel model; and for at least one of the multiple receive antennas:

receive one or more feedback signals from one or more power amplifiers associated with the one or more transmitted signals;

calculate one or more estimated self-interference (SI) signals based on the one or more feedback signals using the equalizer array; and subtract the one or more estimated SI signals from one or more receive signals received at the at least one receive antenna to obtain one or more residual signals, wherein to determine the equalizer array, the program code causes the device to broadcast second transmit signals on all of the multiple transmit antennas, and receive (i) second feedback signals associated with the second transmit signals and (ii) second receive signals received by the multiple receive antennas.

16. The non-transitory computer readable medium of claim 15, wherein the one or more SI signals are configured to cancel SI caused by the one or more transmitted signals leaking into at least one of the multiple receive paths of the transceiver.

17. The non-transitory computer readable medium of claim 15, wherein to determine the equalizer array, the program code further causes the device to perform a least squares estimation using the second feedback signals and the second receive signals to learn multiple equalizers comprising the equalizer array.

18. The non-transitory computer readable medium of claim 15, wherein the device is part of a hybrid multiple-input multiple-output (MIMO) system.

19. The non-transitory computer readable medium of claim 18, wherein a channel between each transmit path and each receive path is determined based on information associated with one or more analog phase shifter values.

20. The non-transitory computer readable medium of claim 15, wherein the one or more feedback signals are received via one or more feedback paths, each feedback path comprising one or more of:

at least one filter;

a radio frequency analog-to-digital converter (RFADC); and a numerically controlled oscillator (NCO).

* * * * *